United States Patent
Zouzal et al.

(10) Patent No.: US 10,165,863 B2
(45) Date of Patent: *Jan. 1, 2019

(54) THORACIC REGION COMFORT SEATING SYSTEM

(71) Applicants: Lear Corporation, Southfield, MI (US); Winsen C. Zouzal, Detroit, MI (US)

(72) Inventors: Winsen C. Zouzal, Detroit, MI (US); Ashford Allen Galbreath, Troy, MI (US); Asad S. Ali, Troy, MI (US); Terry O'Bannon, Royal Oak, MI (US); Gerald Steven Locke, Lake Orion, MI (US); Jennifer Badgley, Waterford, MI (US); Thomas S. Hicks, Livonia, MI (US); Walter T. Cichocki, Brighton Township, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,641

(22) Filed: Nov. 27, 2017

(65) Prior Publication Data

US 2018/0078043 A1 Mar. 22, 2018

Related U.S. Application Data

(63) Continuation of application No. 14/423,120, filed as application No. PCT/US2013/056119 on Aug. 22, 2013, now Pat. No. 9,826,840.
(Continued)

(51) Int. Cl.
A47C 7/02 (2006.01)
A47C 7/46 (2006.01)
(Continued)

(52) U.S. Cl.
CPC .......... *A47C 7/46* (2013.01); *A47C 7/402* (2013.01); *A47C 7/425* (2013.01); *A47C 27/148* (2013.01);
(Continued)

(58) Field of Classification Search
CPC .......... B60N 2/64; B60N 2/643; B60N 2/646; A47C 7/42; A47C 7/425; A47C 7/40
(Continued)

(56) References Cited

U.S. PATENT DOCUMENTS 1,205,802 A 11/1916 Silbert
1,673,433 A 6/1928 Wheeler et al.
(Continued)

FOREIGN PATENT DOCUMENTS

CN 86206957 U 7/1987
CN 2072791 U 3/1991
(Continued)

OTHER PUBLICATIONS

Office Action of corresponding Chinese Patent Application No. CN20138042613.5; dated Apr. 6, 2016; 10 pages.
(Continued)

*Primary Examiner* — Chi Q Nguyen
(74) *Attorney, Agent, or Firm* — Brooks Kushman P.C.

(57) ABSTRACT

A thoracic support for a seatback of a seat is provided. The thoracic support has a center portion extending in an upright direction and adapted to be positioned adjacent the seatback to align adjacent a thoracic region a user's spine and having a first hardness. A pair of side portions are each disposed on opposing lateral sides of the center portion. The side portions have a second hardness less than the first hardness of the center portion. The pair of side portions and the center portion to define a smooth forward support surface.

20 Claims, 4 Drawing Sheets

Related U.S. Application Data (60) Provisional application No. 61/692,432, filed on Aug. 23, 2012, provisional application No. 61/717,374, filed on Oct. 23, 2012, provisional application No. 61/781,072, filed on Mar. 14, 2013.

(51) Int. Cl.
  *B60N 2/66* (2006.01)
  *A47C 7/42* (2006.01)
  *A47C 27/14* (2006.01)
  *A47C 7/40* (2006.01)
  *B60N 2/64* (2006.01)

(52) U.S. Cl.
  CPC ............... *B60N 2/66* (2013.01); *B60N 2/665* (2015.04); *A47C 7/40* (2013.01); *A47C 7/42* (2013.01); *B60N 2/64* (2013.01); *B60N 2/643* (2013.01); *B60N 2/646* (2013.01)

(58) Field of Classification Search
  USPC ... 297/DIG. 1, 230.12, 230.13, 230.1, 284.3, 297/284.6, 284.1, 452.33, 452.34, 452.31, 297/452.35, 452.37
  See application file for complete search history.

(56) References Cited

U.S. PATENT DOCUMENTS

| | | | |
|---|---|---|---|
| 1,937,920 A | 12/1933 | Smith | |
| 2,647,560 A | 8/1953 | Huebener | |
| 3,215,468 A | 11/1965 | Swenson et al. | |
| 3,880,463 A | 4/1975 | Shephard et al. | |
| 3,883,257 A | 5/1975 | Delafield | |
| 4,239,282 A | 12/1980 | White | |
| 4,306,750 A | 12/1981 | Wenger et al. | |
| 4,572,578 A * | 2/1986 | Perkins | A47C 7/46 297/452.32 |
| 4,834,455 A * | 5/1989 | Proctor | B60N 2/643 297/284.7 |
| 4,835,801 A | 6/1989 | Walpin et al. | |
| 4,884,846 A | 12/1989 | Tobler | |
| 4,930,173 A | 6/1990 | Woller | |
| 4,981,325 A | 1/1991 | Zacharkow | |
| 5,000,515 A | 3/1991 | Deview | |
| 5,039,158 A | 8/1991 | Maier | |
| 5,452,940 A | 9/1995 | Maier | |
| 5,474,362 A | 12/1995 | Albecker, III | |
| 5,522,645 A | 6/1996 | Dahlbacka | |
| 5,564,144 A | 10/1996 | Weingartner et al. | |
| 5,580,124 A | 12/1996 | Dellanno | |
| 5,833,321 A | 11/1998 | Kim et al. | |
| 5,868,466 A | 2/1999 | Massara et al. | |
| 5,884,968 A | 3/1999 | Massara | |
| 5,975,632 A | 11/1999 | Ginat | |
| 6,419,318 B1 | 7/2002 | Albright | |
| 6,447,058 B1 | 9/2002 | Jackson | |
| 6,530,622 B1 | 3/2003 | Ekern et al. | |
| 6,565,153 B2 | 5/2003 | Hensel et al. | |
| 6,565,157 B2 | 5/2003 | Barlie, Jr. et al. | |
| 6,688,686 B1 | 2/2004 | McEvoy et al. | |
| 6,910,741 B2 | 6/2005 | Footitt | |
| 6,938,956 B1 | 9/2005 | Piretti | |
| 6,945,601 B1 | 9/2005 | Wu | |
| 7,128,372 B2 | 10/2006 | Farquhar et al. | |
| 7,213,880 B2 | 5/2007 | Schmitz et al. | |
| 7,413,250 B2 | 8/2008 | Connolly et al. | |
| 7,429,080 B2 | 9/2008 | Walker et al. | |
| 7,445,008 B1 | 11/2008 | Walker | |
| 7,445,292 B2 | 11/2008 | Moule | |
| 7,690,731 B2 | 4/2010 | Kuester | |
| 7,862,120 B2 | 1/2011 | Ueda | |
| 7,874,618 B2 | 1/2011 | Kohl et al. | |
| 7,878,590 B1 | 2/2011 | Bilak | |
| 7,967,379 B2 | 6/2011 | Walters et al. | |
| 8,261,386 B2 | 7/2012 | Kardos | |
| 8,690,249 B2 | 4/2014 | Kang et al. | |
| 8,764,110 B2 | 7/2014 | Hsuan-Chin | |
| 8,931,837 B2 | 1/2015 | Vernon | |
| 9,826,840 B2 * | 11/2017 | Zouzal | A47C 7/46 |
| 2005/0062323 A1 | 3/2005 | Dicks | |
| 2006/0103204 A1 | 5/2006 | Walker et al. | |
| 2006/0170274 A1 * | 8/2006 | Moule | B60N 2/643 297/452.25 |
| 2007/0222265 A1 | 9/2007 | Michael et al. | |
| 2008/0116730 A1 | 5/2008 | Connolly et al. | |
| 2008/0315644 A1 | 12/2008 | Briscoe | |
| 2009/0051199 A1 * | 2/2009 | Crosbie | A47C 7/40 297/230.11 |
| 2010/0148562 A1 | 6/2010 | McClung et al. | |
| 2010/0164266 A1 | 7/2010 | Walters et al. | |
| 2011/0018329 A1 | 1/2011 | Galbreath et al. | |
| 2011/0101745 A1 | 5/2011 | Chen | |
| 2013/0125313 A1 | 5/2013 | Yamasaki et al. | |
| 2013/0302584 A1 | 11/2013 | Laflamme et al. | |
| 2015/0069810 A1 | 3/2015 | Yamasaki et al. | |
| 2015/0080994 A1 | 3/2015 | Ho | |
| 2015/0216313 A1 | 8/2015 | Zouzal et al. | |
| 2015/0320219 A1 | 11/2015 | Berns | |
| 2016/0031321 A1 | 2/2016 | Ono et al. | |
| 2016/0031351 A1 | 2/2016 | Galbreath et al. | |

FOREIGN PATENT DOCUMENTS

| | | |
|---|---|---|
| CN | 1847049 A | 10/2006 |
| CN | 101128138 A | 2/2008 |
| CN | 201438906 U | 4/2010 |
| CN | 102271554 A | 12/2011 |
| DE | 102008037231 A1 | 2/2010 |
| DE | 102011102122 A1 | 11/2012 |
| DE | 102013209465 A1 | 7/2014 |
| GB | 2197659 A | 5/1988 |
| GB | 2275416 A | 8/1994 |
| JP | 3142619 U | 6/2008 |
| WO | 2007030893 A1 | 3/2007 |
| WO | 2011130264 A1 | 10/2011 |
| WO | 2012019823 A1 | 2/2012 |

OTHER PUBLICATIONS

CN 201380042609.9 Chinese Office Action; dated Feb. 4, 2017; 16 pages.
EP 13831194.9 European Examination Report; dated Feb. 10, 2017; 5 pages.
U.S. Appl. No. 14/423,121 Office Action; dated Mar. 29, 2017; 10 pages.
CN 201380042609.9 Chinese Office Action; dated May 17, 2016; 12 pages.
EP 13830750.9 European Examination Report; dated May 18, 2017; 5 pages.
International Search Report and Written Opinion or corresponding International PCT/US2013/056119; dated Jan. 17, 2014; 8 pages.
International Search Report and Written Opinion or corresponding International Application No. PCT/US2013/056120 dated Feb. 3, 2015; 8 pages.
European Search Report for EP Application No. 13831194.9; dated Apr. 5, 2016; 8 pages.
European Search Report for EP Application No. 13830750.9; dated Apr. 6, 2016; 7 pages.
Office Action of corresponding Chinese Patent Application No. CN201380042613.5; dated Mar. 7, 2018; 13 pages.

* cited by examiner

| Component | Description | Nominal Density (kg/m³) | Hardness Range* (N) |
|---|---|---|---|
| Side portion | A17340NL/Type 1 Laminatied foam - FXI | 25 | 70-90 |
| Center portion | Q-31 Slab foam - Carpenter | 42 | 125-145 |
| | Q-41 Slab foam - Carpenter | 41 | 150-175 |
| | Q-51 Slab foam - Carpenter | 50 | 200-225 |

* 25% hardness test on 400x400x100mm foam block

THORACIC REGION COMFORT SEATING SYSTEM

CROSS-REFERENCE TO RELATED APPLICATION

This application is a Continuation of U.S. Ser. No. 14/423,120 filed Feb. 21, 2015 now U.S. Pat. No. 9,862,840, which is the U.S. national phase of PCT Application No. PCT/US2013/056119 filed on Aug. 22, 2013, which claims the benefit of U.S. Provisional Patent Application Nos. 61/692,432 filed on Aug. 23, 2012, 61/717,374 filed on Oct. 23, 2012, and 61/781,072 filed on Mar. 14, 2013, the disclosures of which are incorporated in their entirety by reference herein.

TECHNICAL FIELD

The present application is directed to a thoracic region support system for a seatback.

BACKGROUND

In a seated position, the thoracic region of a person's spine is required to support much of the person's upper body mass. When seated for extended periods of time, such as at a desk or on an airplane, the muscles of the person's upper body and vertebrae and discs in the lumbar region and pelvic region of the spine can become significantly fatigued.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this invention. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

It is believed that supporting the thoracic region of the spine can reduce forces and support as much as one-third of the upper body mass. By increasing support of the upper body mass, loads are reduced on the muscles, vertebrae and discs in the lumbar region and pelvic region of the spine. Decreased load reduces fatigue on these areas of the body. The current prevalent comfort back supporting technology for the furniture and transportation market focuses on the lumbar (lower) region of the back to provide relief from fatigue. With the change from a primarily labor intensive work force to one of computer using desk workers we see an increase in upper back discomfort and a decrease in lower back discomfort. This is driving the need for an improvement in the location of the seating support system designed to provide relief for fatigue and the resultant discomfort.

A comfort seating system for seating for furniture or comfort vehicular seating systems, such as in office, automotive or aircraft seating, provides supporting pressure along the thoracic region of the user's spine between the T2 to the T12 vertebrae, and even to the L3 vertebrae.

The support structure is to be positioned along the thoracic region of a seat back when the user is seated. In at least one embodiment, the support structure has a harder center portion or centroid area, and softer side portions. In this embodiment, the center portion is intended to provide spinal support while the side portions are designed to allow the area along either side of the spine to sink in with less resistance than in the center portion. In at least this embodiment, the support structure is formed of different density and different hardness foams so that the center portion has a higher density and higher hardness foam than the foam forming the side portions. The support structure can be used in a variety of seating systems. Some exemplary seating systems and components are shown and described below.

There are four main factors that affect subjective comfort: 1) smoothness of the pressure integral; 2) sufficiency of the pressure change; 3) ability to create even pressure for a wide range of anthropometry; and 4) ergonomic/control suitability of actuation.

A thoracic region comfort seating system design is focused on addressing subjective comfort factors. Smoothness of the pressure integral is accomplished by having a centroid of supporting high pressure with a lower pressure zone surrounding either side of the central support to promote a feeling of smooth transition from center to outer edges. In this manner, the occupant will experience relatively little discomfort from feeling the hardness transition between parts of the design. In addition, by supporting the thoracic region, the user's muscular ligamentous structures are supported which may increase biomechanical abilities and efficiencies for the muscular, physiological and neurological systems.

Sufficiency of the pressure change and the need to create even pressure for a wide range of anthropometry can be accommodated by either having the degree of pressure adjustable, or if not adjustable, designed design for a fiftieth male and female population location of the thoracic region, thereby minimizing the possibility of larger or smaller occupants experiencing discomfort.

Figure 1:
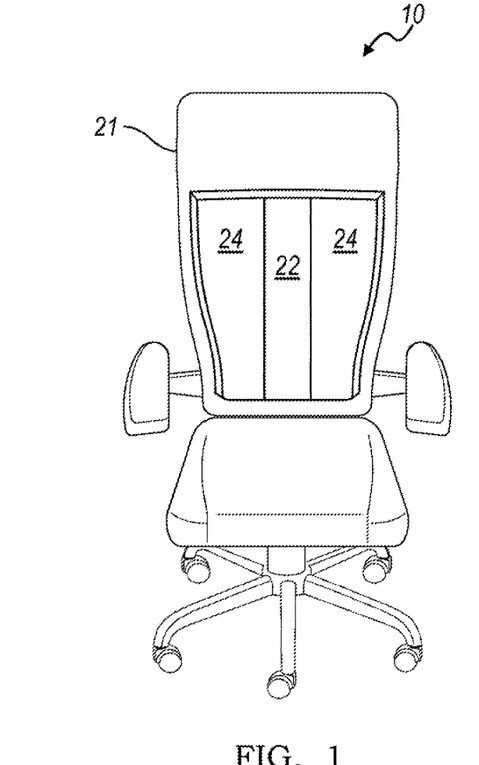
FIG. 1 illustrates a cut-away front view of an exemplary non-adjustable support system for a seatback according to one embodiment, with a portion of one of the components removed for illustrative purposes.

One concept, as shown in FIG. 1, provides an exemplary static support system 10 to support the thoracic region of the user's spine and enhance the comfort of the user. FIG. 1 shows a cutaway of a desk chair having the static support system 10 so that the thoracic support structure 20 is exposed. Typically, the thoracic support structure 20 is covered with material, such as leather, vinyl, cloth, or mesh, to match the seatback 21 of the office chair to which the thoracic support structure 20 is provided on.

Figure 2:
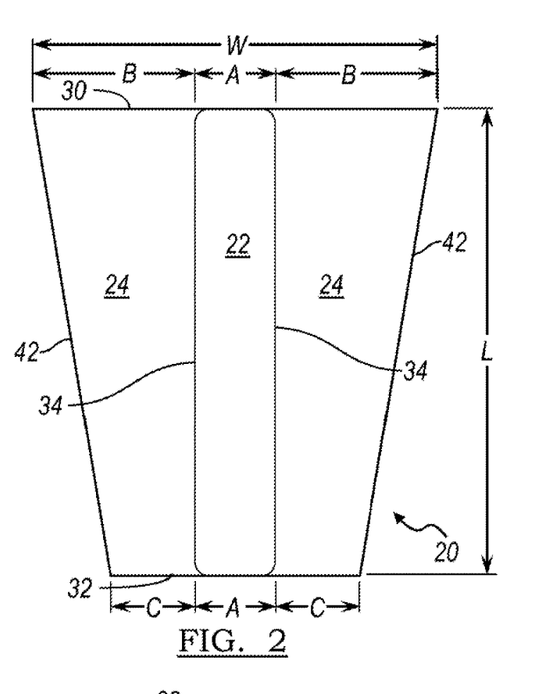
FIG. 2 is a schematic illustration of a thoracic support structure for the non-adjustable support system of FIG. 1.

FIG. 2 depicts a schematic illustration of the exemplary thoracic support structure 20 of FIG. 1. The static support system 10 includes a thoracic support structure 20 shaped of an inverted trapezoid, where a top portion 30 is wider than a bottom portion 32. It is also contemplated that the thoracic support structure 20 may have an alternate shape such as rectangular or pear-shaped.

As shown in FIG. 2, the thoracic support structure 20 has a center portion 22 and outer side portions 24. In at least one embodiment, the center portion 22 is formed of higher density and higher hardness foam than the outer side portions 24. The higher hardness of the center portion 22 is more supportive and has more resistance to deflection. The center portion 22 provides support to the thoracic region of the user's spine. The side portions 24 are softer and less dense and provide shoulder blade relief.

As illustrated, the center portion 22 may be rectangular shaped. However, the center portion 22 may be any suitable shape, such as oblong, diamond-shaped, cylindrical, triangular, elliptical, tear-shaped or trapezoidal, for example.

The side portions 24 may be formed along the lateral sides 34 of the center portion 22. It is also contemplated that the side portions 24 can enclose the center portion 22 surrounding the periphery of the center portion 22. As illustrated, the outer side portions 24 may be trapezoidal shaped. However, the side portions 24 may be any suitable shape, such as oblong, diamond-shaped, cylindrical, triangular, elliptical, tear-shaped or rectangular, for example.

In the illustrated embodiment, the thoracic support structure 20 is molded with a profile having a convex support surface of A-surface 26 and a flat B-surface 28. The A-surface 26 is the surface closest to the user, whereas the B-surface 28 faces away from user.

Figure 2A:
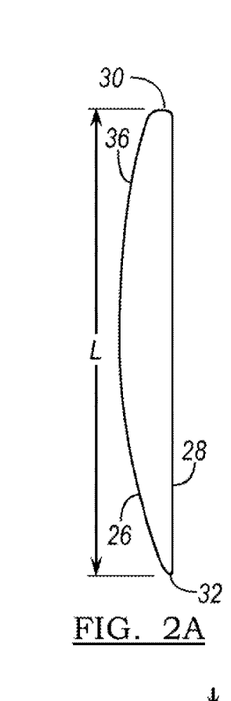
FIG. 2A is a side view of the thoracic support structure of FIG. 2.
Figure 2B:
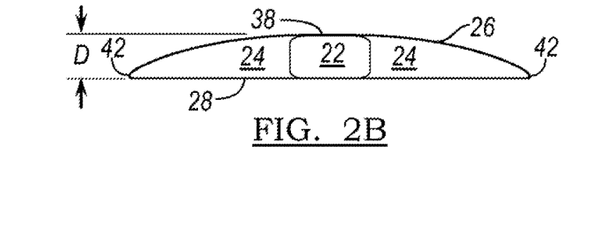
FIG. 2B is a top view of the thoracic support structure of FIG. 2.

FIG. 2A shows a vertical cross section of the thoracic support structure 20. In the vertical cross-section, the A-surface 26 is convex with an apex 38 located at distance of one-third of the overall length measured from the top 30 of thoracic support structure 20. FIG. 2B shows a horizontal cross-section of the thoracic support structure 20. In the horizontal cross-section, the surface 26 is convex having an apex 38 generally centered along the width of the thoracic support structure 20.

In one embodiment shown in FIG. 2, the thoracic support structure 20 can have an overall dimension where the thickness D of the thoracic support structure 20 is less than one inch, or approximately 2.5 centimeters at the thickest point along the center portion 22. The support surface or A-surface 26 is contoured so that the thickness of the thoracic support structure 20 tapers to a rounded edge or radius along each of the vertical sides 42. The thickness of the thoracic support structure 20 also tapers to an edge at the top 30 in the bottom 32.

In the illustrated embodiment, the thoracic support structure 20 has a vertical length L of generally eighteen inches, or approximately 45 centimeters, a width W along the top 30 of fourteen inches, or approximately 35 centimeters, and a width along the bottom 32 of twelve inches, or approximately 30 centimeters. In another embodiment, the support structure 20 has a maximum overall width W of 25 centimeters to 50 centimeters and a length L of 20 centimeters to 55 centimeters, and in other embodiments a width W of 7 centimeters to 25 centimeters and a length of 40 centimeters to 50 centimeters. In at least one embodiment illustrated in FIG. 2, the center portion 22 has a constant width A of 6 centimeters to 12 centimeters wide, with the side portions 24 each having a width B of 10 centimeters to 15 centimeters and the width of the side portions narrowing to a width C of 7 centimeter to 12 centimeters. In at least the illustrated embodiment in FIG. 2, the thoracic support structure 20 is the shape of a trapezoid having a wider width along the top 30 and a narrower width along the bottom 32. It is also contemplated however that the thoracic support structure 120 may have any suitable shape such as, but not limited to, square or rectangle having a lower aspect ratio, or other suitable shape, such as a triangle, or circle, for example.

In the embodiment pictured in FIG. 2, the center portion 22 may have a generally constant thickness D and width and a lateral width of three inches, or approximately 8 centimeters. In another embodiment, the center portion 22 may have a thickness that is greater than the thickness of the outer side portions 24.

In one embodiment, the surface area ratio of the surface area of the side portions 24 to the surface area of the center portion 22 may be approximately two-to-one. While examples of dimensions of the thoracic support structure 20 are described herein and further illustrated in FIG. 2, it is also contemplated that the dimensions of the thoracic support structure 20 may vary depending on the size of the seat, and space constraints for transportation seats or furniture, or other environmental factors.

Figure 3:
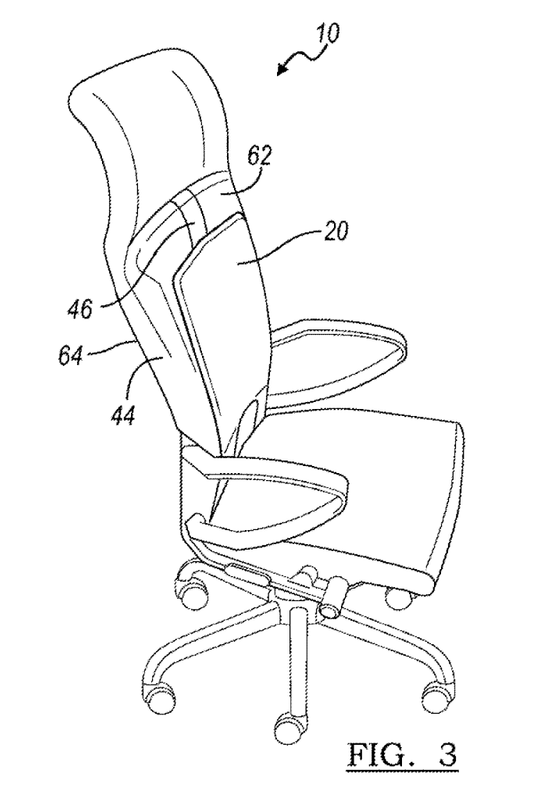
FIG. 3 is a side perspective view of a non-adjustable support system according to another embodiment of the present disclosure.

The static support system 10 can be attached on top of the primary seatback, as shown in FIG. 3. In FIG. 3, the thoracic support structure 20 is encased with the material covering 44. A fastener 46 attaches the thoracic support structure 20 to the seatback. The fastener 46 may be attached to the covering 44. The fastener 46 may be a strap, elastic, adhesive, a hook-and-loop fastener or any suitable attachment device to secure the static support system 10 to the seatback 21. The seatback 21 may also include a headrest portion 50 located adjacent the thoracic support structure 20 in the vertical direction.

Figure 4:
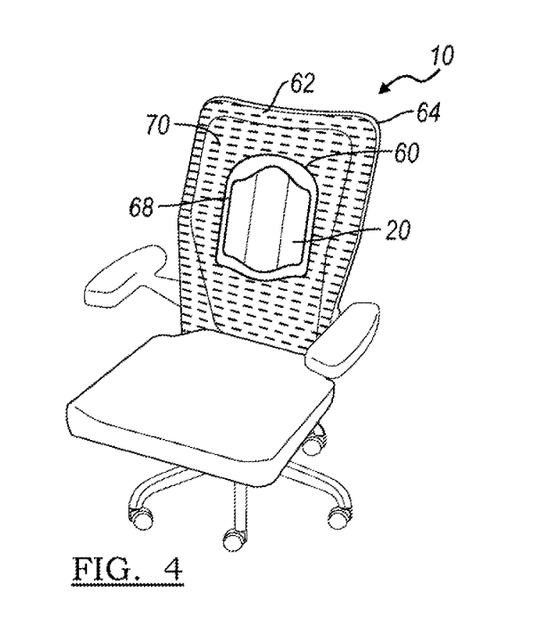
FIG. 4 is a front perspective view of a non-adjustable support system according to another embodiment of the present disclosure.

As shown in FIG. 4, the static support system 10 can be attached to the primary seatback with a pocket 60. The pocket 60 may be formed on a front surface 62 or a rear surface 64 of the seatback 21. The pocket 60 may be formed of a double layer of material proximate the seatback trim material 34. The pocket 60 may be affixed to the affixed to the seatback 21 with adhesive or stitching, or any other suitable method to attach the pocket 60 to the seatback 60. The pocket 60 may be shaped to receive as an insert 68 such as a thoracic support structure 20.

Also illustrated in FIG. 4, the seatback 21 may be formed of a mesh or perforated material backing 70. The mesh or perforated material backing 70 allows air permeability. The mesh or perforated material also helps the seatback 21 to be breathable to allow temperature regulation of the occupant, for example.

Figure 5:
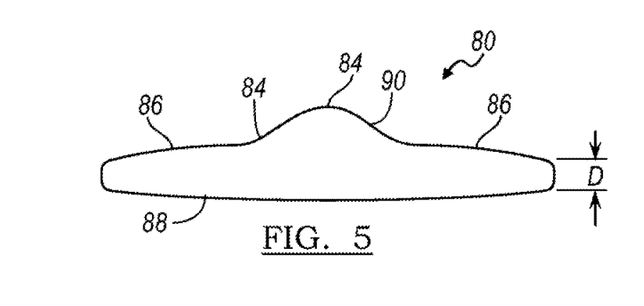
FIG. 5 is a top view of another thoracic support structure for the non-adjustable support system of the present disclosure.

FIG. 5 illustrates a top view of a thoracic support structure 80 for use in the pocket 60, for example. The support structure 80 may be formed of a single material with a raised protrusion 82 formed along a center portion 84. Side portions 86 have a thickness D less than the center portion 84. The center portion 84 defining the protrusion defines harder region than the side potions 86. As such, the center portion 84 provides greater support for a user's spine.

The support structure 80 may be formed of thermoplastic olefin, thermoplastic urethane, expanded polypropylene, natural rubber, latex or silicon, for example, or any suitable material being semi-flexible and lightweight. The support structure 80 may be used as an insert 68 for example. The support structure 80 may be formed of a single material, or a may also include stiffener layer along a B-surface 88 or a softer later of material laminated to the support surface or A-surface 90, for example.

Figure 6:
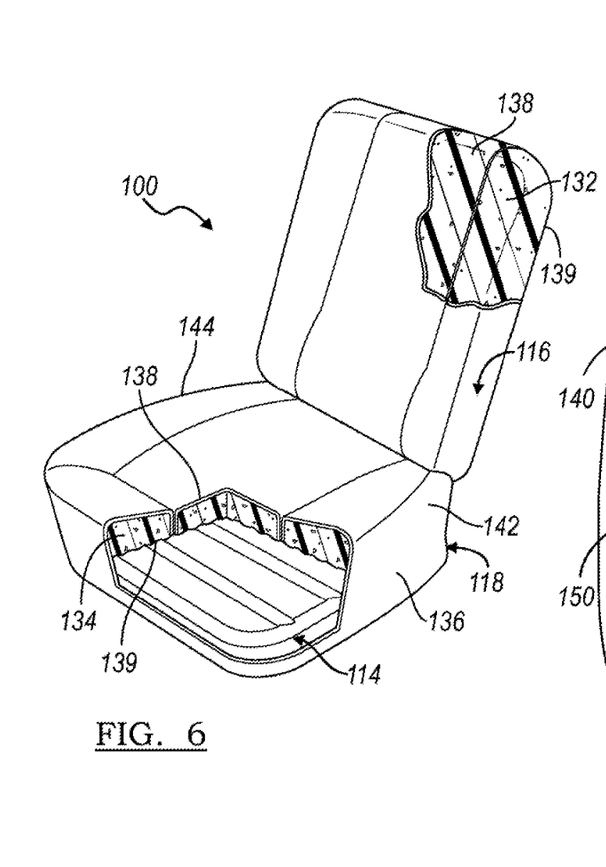
FIG. 6 illustrates a cut-away front view of an exemplary non-adjustable support system for a vehicle seatback according to one embodiment of the present disclosure.
Figure 7:
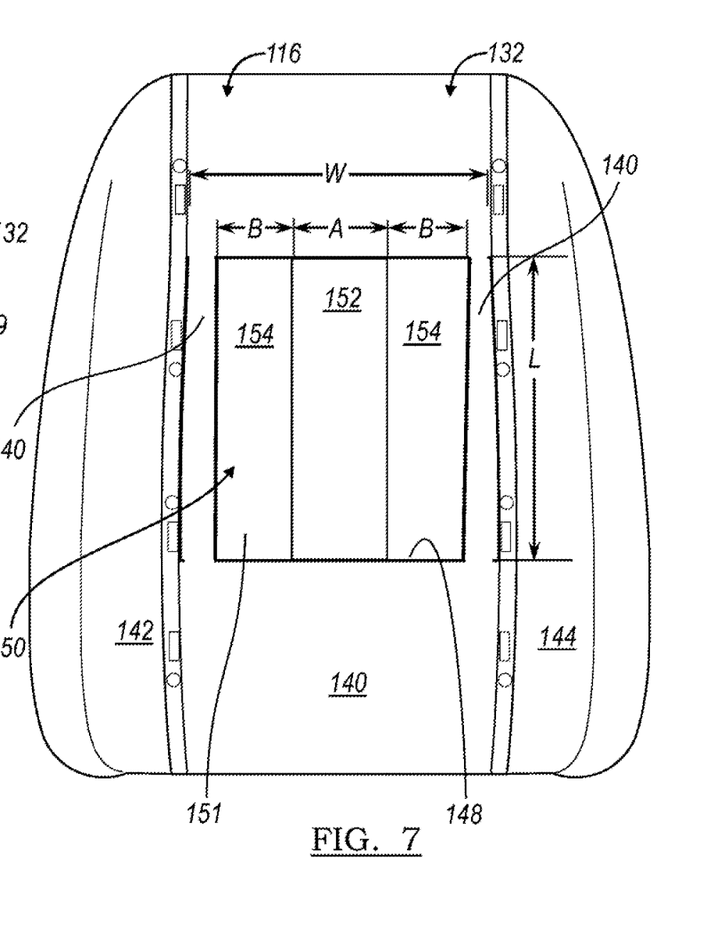
FIG. 7 illustrates the vehicle seatback with a portion of one of the components removed for illustrative purposes to show an example of a thoracic support structure for the non-adjustable support system of FIG. 6.

Alternatively, the thoracic support structure can be integrated into the primary seatback, as shown in FIGS. 6-7. In FIG. 6, a schematic vehicle seat assembly in accordance with at least one embodiment of the present disclosure is generally shown at 110. While the vehicle seat assembly 110 is illustrated in FIG. 6 to be a bucket seat assembly, it should be understood that the principles of the present disclosure are applicable to other types of seat assemblies, such as bench, captain, and other types of seat assemblies.

As shown in FIG. 6, the vehicle seat assembly 110 includes a seat frame, generally indicated at 114 having a plurality of mounting brackets (not shown) adapted to operatively secure the seat frame within a vehicle. The seat frame 114 may be constructed from any material suitable for application within a vehicle seat assembly 110, such as aluminum, steel or other metal alloy or a suitable polymer. Further, the seat frame 114 may be manufactured using a technique commonly known in the art, relative to the type of material employed. By way of example, manufacturing techniques may include stamping, welding, fastening or molding a suitable material to form a seat frame 14.

The vehicle seat assembly 110 includes a seat back, generally indicated at 116, and a lower seat assembly, generally indicated at 118. The vehicle seat assembly 110 further includes a back foam cushion 132 and a seat foam cushion generally indicated at 134. The back foam cushion 132 and the seat foam cushion 134 are conventionally secured to the seat frame 114 and/or a seat assembly infrastructure (not shown). The foam cushions 132 and 134 may be secured to the seat frame 14 and/or infrastructure by any method generally known in the art, such as by an adhesive.

The vehicle seat assembly 110 also includes a trim material 136 adapted to engage the foam cushions 132 and 134 in a covering relationship. The trim material 136 may include any material commonly known in the art. By way of example, some of the known materials include cloth, leather, or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as trim material 136 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of the trim material 34 for increasing strength without increasing rigidity.

The seat cushions 132 and 134 each have an upper surface 138 and a lower surface 139 spaced from the upper surface 138. The upper surface 138 of the seat cushions 132 and 134 may be referred to as the "A" surface, and the lower surface 39 may be referred to as the "B" surface.

FIG. 7 depicts a schematic illustration and exemplary dimensions of the exemplary seatback foam cushion 132 of FIG. 6. The cushion 132 can be any suitable size and shape and in at least one embodiment is 2 to 10 centimeters thick. The exemplary seatback foam cushion 132 includes a central support portion 140 and side bolsters 142 and 144. In at least one embodiment, the central support portion 140 includes a recess 148 that receives a thoracic support structure or cushion insert 150. The thoracic support structure 150 can be secured within the recess 148 in any suitable manner, such as by adhesive, or an interference or friction fit. In at least another embodiment, the thoracic support structure 150 could be inserted from the lower surface 139 with a rear pad then being adhered to the cushion 132 to assist in retaining the structure 150 in place. In at least one embodiment, the structure 150 is first molded, or otherwise formed, and then placed in the cushion mold tool with the cushion 132 being molded around the structure 150. It should be understood that the seat cushion 132 can be any suitable size and made of any suitable cushion material and by any suitable cushion making process. It should also be understood that the cushion 132 is similar to conventional cushions except that it has a recess 148 or other suitable receptacle for housing the insert 150. It should also be understood that the recess 148 can be made by any suitable process such as by molding a recess into the cushion or by cutting or machining a recess into the cushion.

In at least the illustrated embodiment, the structure 150 has a width W of 5 centimeters to 20 centimeters and a length L of 6 centimeters to 25 centimeters, and in other embodiments a width of 7 centimeters to 25 centimeters and a length of 7.5 centimeters to 50 centimeters. In at least the illustrated embodiment, the thoracic support structure 150 is the shape of a square, or rectangle having a low aspect ratio. It is also contemplated however that the thoracic support structure 120 may have any suitable shape such as, but not limited to, rectangle having a higher aspect ratio, a trapezoid, an inverted trapezoid, a triangle, a circle, or other suitable shape.

As shown in FIG. 7, the thoracic support structure 150 has a center portion 152 and adjacent side portions 154. In at least one embodiment, the center portion 152 is formed of higher density and higher hardness foam than the foam of the adjacent side portions 154. As illustrated, the center portion 152 may be rectangular shaped. However, the center portion 152 may be any suitable shape, such as oblong, diamond-shaped, cylindrical, triangular, elliptical, tear-shaped or trapezoidal, for example. The higher hardness of the center portion 152 is more supportive and has more resistance to deflection. The center portion 152 provides support to the thoracic region of the user's spine. The side portions 154 are softer and less dense and provide shoulder blade relief.

The adjacent side portions 154 may be formed along the lateral sides of the center portion 152. It is also contemplated that the adjacent side portions 154 can enclose the center portion 152 surrounding the periphery of the center portion 152. As illustrated, the adjacent side portions 154 may be rectangular shaped. However, the side portions 154 may be any suitable shape, such as oblong, diamond-shaped, cylindrical, triangular, elliptical, tear-shaped or trapezoidal, for example.

In the illustrated embodiment, the thoracic support structure 150 is molded with a profile having a flat A-surface 151 and a flat B-surface (not shown). The A-surface 151 is the surface closest to the user, whereas the B-surface faces away from user. However, it should be understood that any suitable surface contours could be employed.

In at least one embodiment, the thoracic support structure 150 can have an overall dimension where the thickness of the thoracic support structure 150 is between 2.0 and 7.5 centimeters, and in another embodiment is 2.5 to 5.0 centimeters, but may have any suitable thickness.

As the embodiment pictured in FIG. 7, each of the center portion 152 and the side portions 154 may have generally constant thicknesses and lateral widths. In another embodiment, the center portion 152 may have a thickness that is greater than the thickness of one or both of the side portions 154. While examples of dimensions of the thoracic support structure 150 are described herein, it is also contemplated that the dimensions of the thoracic support structure 150 may vary depending on the side of the seat, and space constraints for vehicle seats or other environmental factors. In at least one embodiment, the center portion 152 has a width A of 7 centimeters to 12 centimeters wide and 20 centimeters tall, with the side portions 154 each have a width B of 5 to 7 centimeters and are 20 centimeters to 25 centimeters tall.

Figure 8:
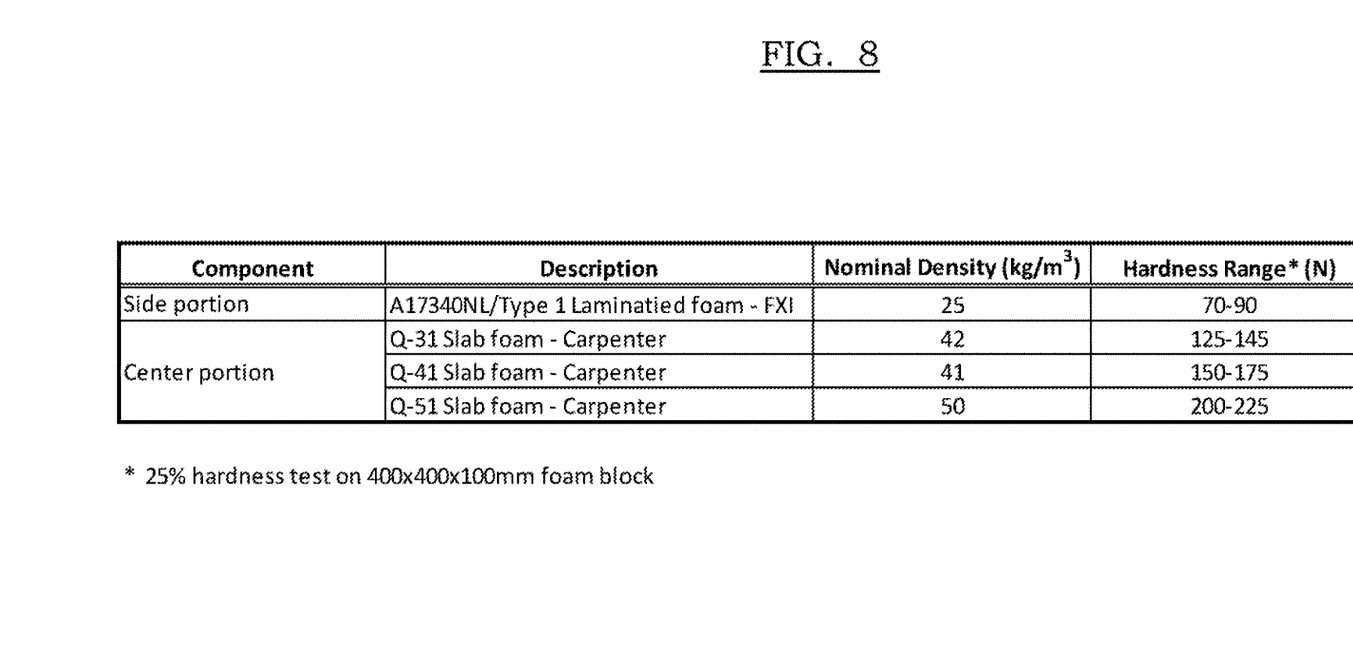
FIG. 8 is a chart of example material properties for a seatback support system.

FIG. 8 illustrates a chart of example materials for a thoracic support structure 20, 150 having the center portion 22, 152 and the side portion 22, 154 can having suitable material properties. For example, in at least one embodiment the center portion can have a density of 35 to 70 kilogram per cubic meter (kg/m$^2$) and a hardness of 100 to 300 Newtons (N). Likewise, the side portions can have a density of 20 to 35 kg/m$^2$ and a hardness of 60 to 100 N. Hardness can be measured by a hardness test of 25% dimensional thickness deflection of a 40 millimeters by 40 millimeters by 10 millimeters block with an 8 inch circular platen. In at least one other embodiment, the center portion has a density of 40 to 60 kilogram per cubic meter (kg/m$^2$) and a hardness of 125 to 175 N, as measured by the hardness test described above, with the side portions. The density and hardness may be measure by ASTM standard 3574, or any reliable measurement standard or technique. In at least one embodiment, the hardness of the center portion may be generally 150% to 250% more than the hardness of the side portions.

In at least one embodiment, to achieve the desired hardness, the center portion may be formed of carpenter slab foam, such as Q-31, Q-41 or Q-51 foam, as shown in FIG. 8. However, it is also contemplated that the center portion may be formed of any suitable material that exhibits suitable hardness for supporting the spine of the user. The area of the seatback 21, 116 surrounding the support member 20, 150 can be made from conventional urethane foam, non-woven polyester, or other standard seating material compositions and thicknesses, depending on intended use, environmental factors, other component compatibility, etc.

In at least one embodiment, the side portions may be formed of a continuous cast of slab molded laminate-type foam such as Type 1 A17340NL, as illustrated in FIG. 8. However, it is also contemplated that the outer side portions may be formed of any suitable material, for example, that allows for the muscle, bone and tissue surrounding the spine of the user to sink in or penetrate with less resistance than the center portion.

While the center portions 22, 152 and side portions 24, 154 are mainly described as being made of a suitable foam material, it is contemplated that one or more of the portions could be formed of another suitable material, such as gel, nonwoven material pads made from polyester, wool, cellulose, or other natural fibers, or air or other suitable fluid-filled bladders.

While the structure 20, 150 is illustrated as having segmented foam blocks, it should be understood that the hardness and density could be provided as gradients such that relatively gradual transitions occur between the adjacent foam pieces.

The details, designs, variants, aspects and embodiments shown and described herein are applicable to automotive, other vehicle, and non-regulated seating. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

We claim a seat system or a thoracic region support seating system comprising any combination of features shown in the figures and/or described in the application.

What is claimed is:

1. A seat comprising:
    a seatback;
    a seat bottom;
    a support structure positioned along the seatback spaced above the seat bottom to support at least a portion of a thoracic region of a use's spine:
    a center portion extending in an upright direction and adapted to be positioned align adjacent the user's spine along the thoracic region, the center portion formed of a first foam material having a first hardness;
    and a pair of side portions each disposed adjacent to and connected with the center portion, the side portions formed of a second foam material having a second hardness,
    wherein the pair of side portions and the center portion to define a smooth forward support surface adjacent the thoracic region of a user's spine,
    the first hardness is greater than the second hardness so that the center portion provides support to at least a portion of the thoracic region of the user's spine.

2. The seat according to 1 wherein the side portions and center portion define a convex prattle in a transverse direction from a first outer lateral edge to a second outer lateral edge of the support, wherein an apex of the transverse convex profile is defined along the center portion.

3. The thoracic support of claim 1 wherein the pair of side portions abut the center portion along opposing lateral sides of the center portion.

4. The seat according to 1 wherein the seatback is formed of a foam material having a third hardness being less than the hardness of the side portions.

5. The seat according to 1 wherein the first foam material has a first density being denser than a second density of the second foam material.

6. The seat according 1 wherein the seatback is formed of a mesh material having a third density being less than the second density of the side portions.

7. The seat according to 1 wherein the support is embedded in the seatback so that the support is retained in the seatback and stationary relative to the seatback.

8. The seat according to 1 wherein the seatback is connected to a seat frame adapted for mounting in a vehicle.

9. The seat according to 1 wherein the seatback is connected to a base of an office chair.

10. A thoracic support for a seatback of a seat, the thoracic support comprising;
a high-pressure centroid region formed of a first foam material having a first hardness: and
a pair of softer side portions connected to the high-pressure centroid region along opposing sides, each of the side portions formed of a second foam material having a second hardness being softer than the first hardness,
wherein a support surface defined by the centroid region and the pair of side portions has a smooth contour to define a smooth pressure integral along the support surface.

11. The thoracic support of claim 10 wherein side portions abut the center portion along opposing lateral sides of the center portion.

12. The thoracic support of claim 10 wherein the centroid region has a constant width extending in the upright direction, and the side portions have a width that narrows from a top to a bottom thereby defining a trapezoidal thoracic support.

13. The thoracic support of claim 10 wherein the side portions and centroid region define a convex profile in a transverse direction from a first edge to a second edge of the support, wherein an apex of the transverse convex profile is defined along the centroid region.

14. A thoracic support for a seatback of a seat, the thoracic support comprising:
a center portion extending in an upright direction and adapted to be positioned adjacent the seatback to align adjacent a thoracic region a user's spine, the center portion having a first hardness; and
a pair of side portions each disposed on opposing lateral sides of the center portion, the side portions having a second hardness less than the first hardness of the center portion,
wherein the pair of side portions and the center portion to define a smooth forward support surface.

15. The thoracic support of claim 14 wherein the pair of side portions abut the center portion along opposing lateral sides of the center portion.

16. The thoracic support of claim 14 wherein the side portions and center portion define a convex profile in a transverse direction from a first outer lateral edge to a second outer lateral edge of the pair of side portions, wherein an apex of the transverse convex profile is defined along the center portion.

17. The thoracic support of claim 14 wherein the center portion includes a convex profile in the upright direction along a support surface.

18. The thoracic support of claim 14 wherein the center portion is formed of a first foam material having a first density and the side portions are formed of a second foam material having a second density, wherein the first density is greater than the second density.

19. The thoracic support of claim 14 further comprising at least one fastener adapted to secure the thoracic support to at least one of a forward surface or a surface rearward of the seatback in a stationary position relative to the seatback.

20. The thoracic support of claim 14 wherein the support is embedded in the seatback so that the support is retained in the seatback and stationary relative to the seatback.

* * * * *